US008832752B2

(12) United States Patent
Cvijetic et al.

(10) Patent No.: US 8,832,752 B2
(45) Date of Patent: Sep. 9, 2014

(54) AUTOMATIC TRANSMISSION CONTENT SELECTION

(71) Applicant: International Business Machines Corporation, Armonk, NY (US)

(72) Inventors: Sasa Cvijetic, Raleigh, NC (US); Adrian X. Rodriguez, Durham, NC (US); Felicia N. Soto, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/692,637

(22) Filed: Dec. 3, 2012

(65) Prior Publication Data

US 2014/0157348 A1 Jun. 5, 2014

(51) Int. Cl.

| H04N 7/173 | (2011.01) |
|---|---|
| H04N 7/16 | (2011.01) |
| H04N 5/445 | (2011.01) |
| G08B 3/00 | (2006.01) |
| G08B 5/00 | (2006.01) |
| G08B 7/00 | (2006.01) |
| H04H 40/00 | (2008.01) |
| H04N 21/458 | (2011.01) |

(52) U.S. Cl.
CPC ............ *H04H 40/00* (2013.01); *H04N 21/458* (2013.01)
USPC ................. 725/87; 725/38; 725/46; 725/28; 725/47; 340/691.1

(58) Field of Classification Search
USPC .............................................. 725/46, 38, 87
See application file for complete search history.

(56) References Cited

U.S. PATENT DOCUMENTS

| 6,925,610 B2 | 8/2005 | Thurston et al. | |
|---|---|---|---|
| 7,353,000 B2 | 4/2008 | Morgan | |
| 7,437,124 B2 | 10/2008 | Bates et al. | |
| 7,565,122 B2 | 7/2009 | Eubanks | |
| 7,647,419 B2 | 1/2010 | Deshpande | |
| 2002/0041692 A1 | 4/2002 | Seto et al. | |
| 2002/0147977 A1* | 10/2002 | Hammett et al. | 725/47 |
| 2003/0101449 A1 | 5/2003 | Bentolila et al. | |
| 2004/0073918 A1* | 4/2004 | Ferman et al. | 725/34 |
| 2004/0157570 A1 | 8/2004 | Eubanks | |
| 2005/0262528 A1 | 11/2005 | Herley et al. | |
| 2006/0143236 A1* | 6/2006 | Wu | 707/104.1 |
| 2006/0212904 A1* | 9/2006 | Klarfeld et al. | 725/46 |
| 2007/0115394 A1 | 5/2007 | Li et al. | |

(Continued)

OTHER PUBLICATIONS

Stitcher, "What Is Smart Radio?" Copyright 2012, pp. 1-2, http://www.stitcher.com/LearnMore.php.

*Primary Examiner* — Pankaj Kumar
*Assistant Examiner* — Tariq Gbond
(74) *Attorney, Agent, or Firm* — Law Office of Jim Boice

(57) ABSTRACT

A processor-implemented method, system, and/or computer program product automatically selects broadcast content at a broadcast receiver. A first broadcast content on a first channel of a broadcast receiver is received and presented aurally and/or visually. A second broadcast content on a second channel of the broadcast receiver is evaluated to determine if it is rated higher than the first broadcast content. A determination is also made as to whether the first broadcast content can be interrupted by the second broadcast content. If the second broadcast content has a higher rating than the first broadcast content, and if it is deemed permissible to interrupt the first broadcast content, then the broadcast receiver automatically switches to the second channel.

13 Claims, 4 Drawing Sheets

(56) References Cited

U.S. PATENT DOCUMENTS

| | | |
|---|---|---|
| 2007/0127726 A1 | 6/2007 | Ellis et al. |
| 2008/0120636 A1* | 5/2008 | Gahman ............... 725/28 |
| 2008/0127243 A1* | 5/2008 | Furutani et al. ............ 725/28 |
| 2009/0023406 A1 | 1/2009 | Ellis et al. |
| 2009/0077592 A1* | 3/2009 | Kamada et al. ............ 725/58 |
| 2009/0158326 A1* | 6/2009 | Hunt et al. ............ 725/38 |
| 2009/0256716 A1* | 10/2009 | Sato et al. ............ 340/691.1 |
| 2009/0319341 A1 | 12/2009 | Berkobin |
| 2009/0327222 A1* | 12/2009 | Spitzer-Williams et al. ..... 707/3 |
| 2010/0088312 A1 | 4/2010 | Goldfeder |
| 2010/0332988 A1* | 12/2010 | Fong et al. ............ 715/727 |
| 2011/0040707 A1 | 2/2011 | Theisen et al. |
| 2011/0072448 A1* | 3/2011 | Stiers et al. ............ 725/10 |
| 2012/0210342 A1* | 8/2012 | Gonzalez et al. ............ 725/25 |
| 2013/0091520 A1* | 4/2013 | Chen ............ 725/34 |
| 2013/0102265 A1* | 4/2013 | Koncelik, Jr. ............ 455/200.1 |

* cited by examiner

AUTOMATIC TRANSMISSION CONTENT SELECTION

BACKGROUND

The present disclosure relates to the field of broadcast receivers, such as radios and televisions. More specifically, the present disclosure relates to automatically selecting content from one of multiple channels on a broadcast receiver.

Broadcast receivers, such as televisions and radios, including radios in mobile vehicles, receive broadcast content via multiple channels. Users of such broadcast receivers often have favorite content (e.g., songs), which may be broadcast on a channel other than the channel that the broadcast receiver is tuned to.

SUMMARY

A processor-implemented method, system, and/or computer program product automatically selects broadcast content at a broadcast receiver. A first broadcast content on a first channel of a broadcast receiver is received and presented aurally and/or visually. A second broadcast content on a second channel of the broadcast receiver is evaluated to determine if it is rated higher than the first broadcast content. A determination is also made as to whether the first broadcast content can be interrupted by the second broadcast content. If the second broadcast content has a higher rating than the first broadcast content, and if it is deemed permissible to interrupt the first broadcast content, then the broadcast receiver automatically switches to the second channel.

DETAILED DESCRIPTION

As will be appreciated by one skilled in the art, some or all of the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some or all of the features described in the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Figure 1:
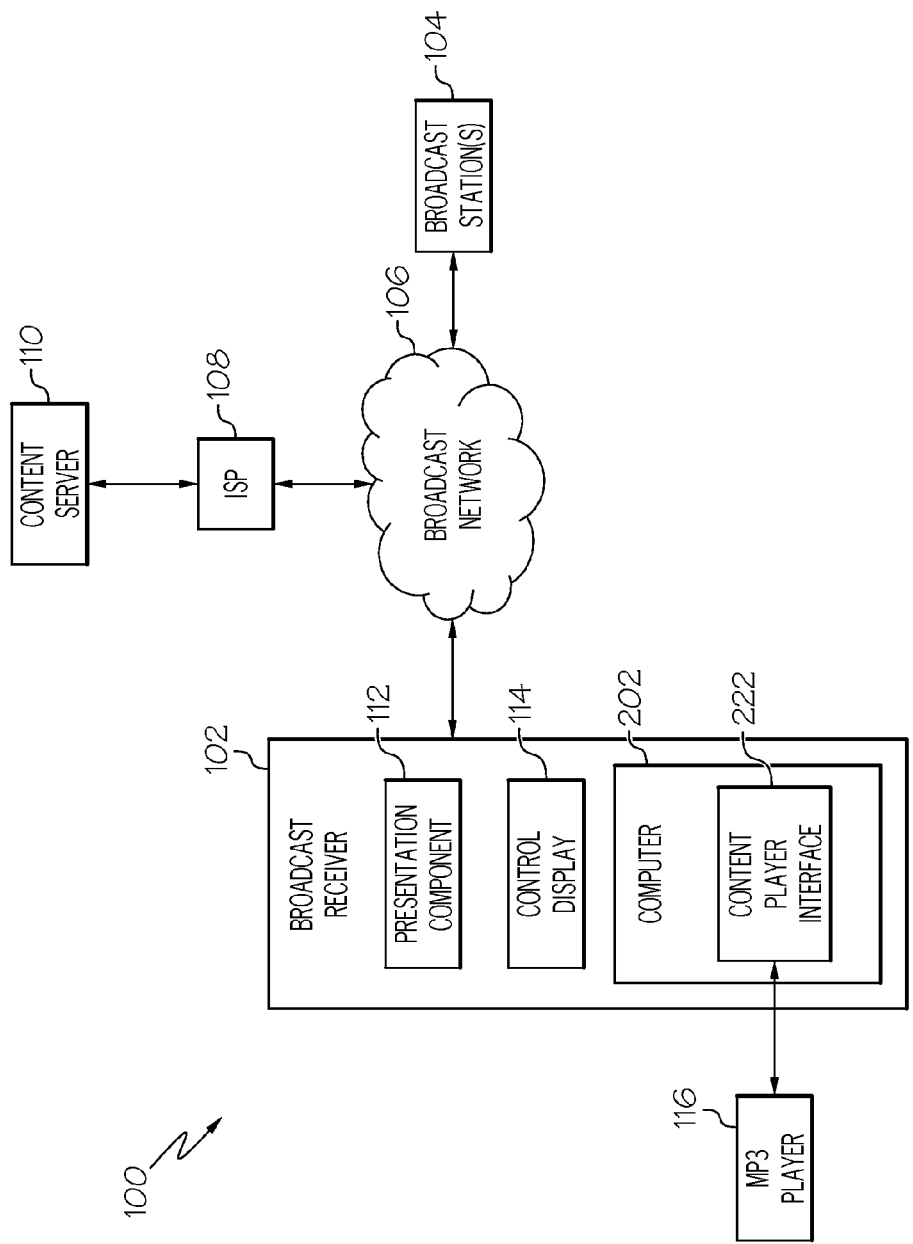
FIG. 1 depicts an exemplary broadcast system in which the present invention may be utilized.

With reference now to the figures, and in particular to FIG. 1, an exemplary broadcast system 100 in which the present invention may be utilized is presented. Broadcast system 100 includes a broadcast receiver 102, which may be a television, a radio, or any other electronic device capable of receiving a media broadcast from a broadcast station 104. In one embodiment, the broadcast receiver 102 is a radio that is in a motor vehicle. Content (e.g., songs) from the broadcast station(s) 104 is broadcast via a wireless broadcast system, or via a broadcast network 106 such as the Internet. Thus, in one embodiment, the broadcast content being sent to the broadcast receiver 102 may be content provided via an Internet Service Provider (ISP) 108 that is connected to a content provider, such as a content server 110.

Broadcast receiver 102 includes a presentation component 112, which may be an audio circuit that includes an amplifier, speakers, etc. needed to make the broadcast content audible. In one embodiment, presentation component 112 includes a video circuit that includes a circuit and display needed to make the broadcast content visible.

Broadcast receiver 102 also includes a control display 114, which is a video interface to the broadcast receiver 102. Control display 114 is described in further detail in FIG. 3.

Broadcast receiver 102 also includes a computer 202, which provides intelligence and logic for performing the processes described herein, including the steps described below in FIG. 4. In one embodiment, computer 202 includes a content play interface 222, which is capable of interfacing with a portable media player such as an MP3 player 116. Computer 202 is described in further detail in FIG. 2.

Figure 2:
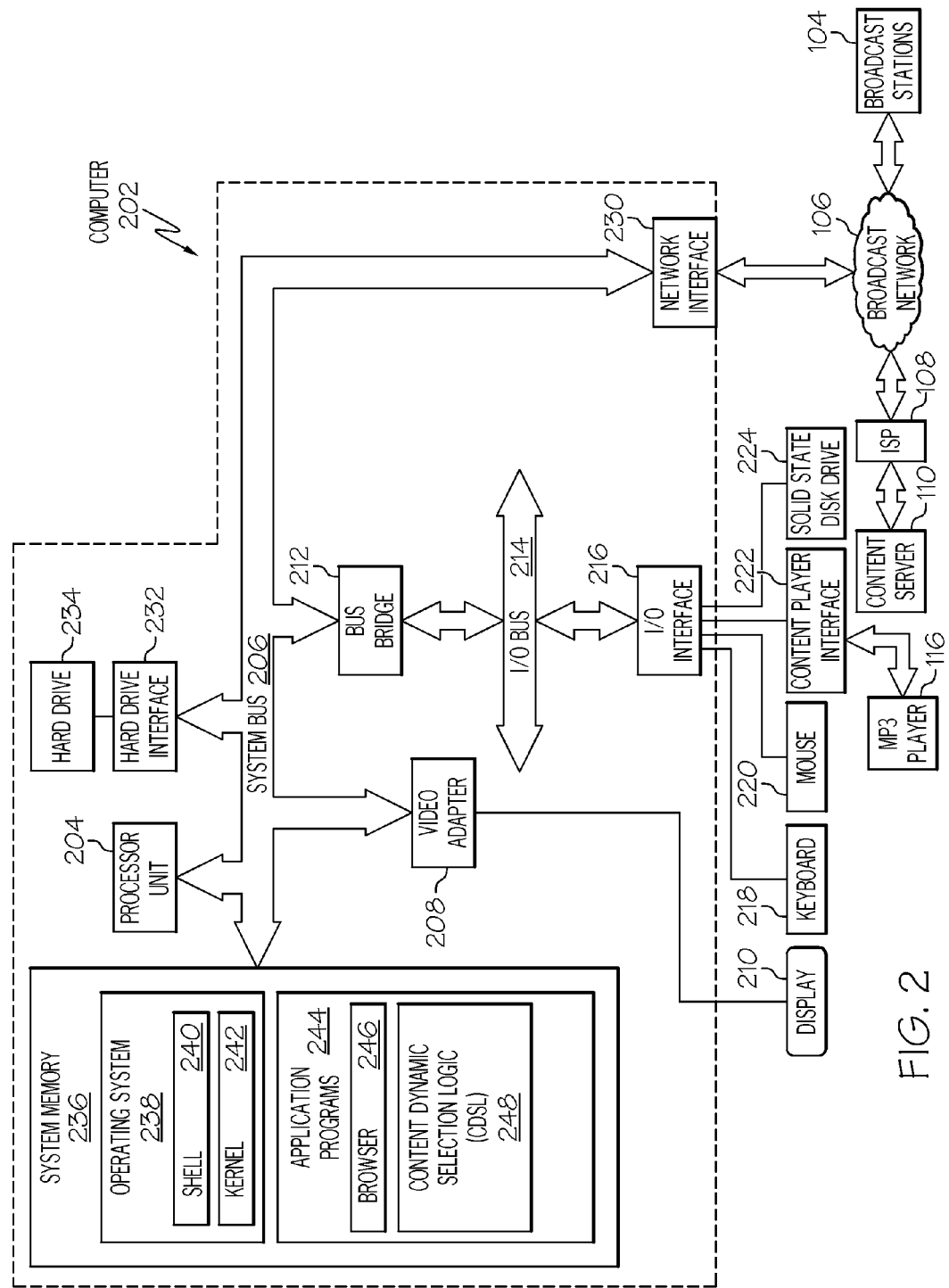
FIG. 2 illustrates an exemplary computer that may be part of the broadcast receiver depicted in FIG. 1.

With reference now to FIG. 2, there is depicted a block diagram of an exemplary computer 202, which may be utilized as part of the broadcast receiver 102 depicted in FIG. 1. Computer 202 includes a processor unit 204 that is coupled to a system bus 206. Processor unit 204 may utilize one or more processors, each of which has one or more processor cores. A video adapter 208, which drives/supports a display 210, is also coupled to system bus 206. In one embodiment, display 210 is both a display device and an input device, capable of receiving user input via touch-screen capabilities.

System bus 206 is coupled via a bus bridge 212 to an input/output (I/O) bus 214. An I/O interface 216 is coupled to I/O bus 214. I/O interface 216 affords communication with various I/O devices, including a keyboard 218, a mouse 220, a content player interface 222 (which is capable of interfacing with a portable media player such as MP3 player 116), and high-speed solid state disk drive 224. While the format of the ports connected to I/O interface 216 may be any known to those skilled in the art of computer architecture, in a preferred embodiment some or all of these ports are universal serial bus (USB) ports.

As depicted, in one embodiment, computer 202 is optionally able to communicate via broadcast network 106 using a network interface 230. Broadcast network 106 may be an external network such as the Internet, or an internal network such as an Ethernet or a virtual private network (VPN), or a wireless broadcast network such as a radio/television network.

A hard drive interface 232 is also coupled to system bus 206. Hard drive interface 232 interfaces with a hard drive 234. In a preferred embodiment, hard drive 234 populates a system memory 236, which is also coupled to system bus 206. System memory is defined as a lowest level of volatile memory in computer 202. This volatile memory includes additional higher levels of volatile memory (not shown), including, but not limited to, cache memory, registers and buffers. Data that populates system memory 236 includes computer 202's operating system (OS) 238 and application programs 244.

OS 238 includes a shell 240, for providing transparent user access to resources such as application programs 244. Generally, shell 240 is a program that provides an interpreter and an interface between the user and the operating system. More specifically, shell 240 executes commands that are entered into a command line user interface or from a file. Thus, shell 240, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. Note that while shell 240 is a text-based, line-oriented user interface, the present disclosure will equally well support other user interface modes, such as graphical, voice, gestural, etc.

As depicted, OS 238 also includes kernel 242, which includes lower levels of functionality for OS 238, including providing essential services required by other parts of OS 238 and application programs 244, including memory management, process and task management, disk management, and mouse and keyboard management.

Application programs 244 include a renderer, shown in exemplary manner as a browser 246. Browser 246 includes program modules and instructions enabling a world wide web (WWW) client (i.e., computer 202) to send and receive network messages to the Internet using hypertext transfer protocol (HTTP) messaging, thus enabling communication with other computer systems.

Figure 3:
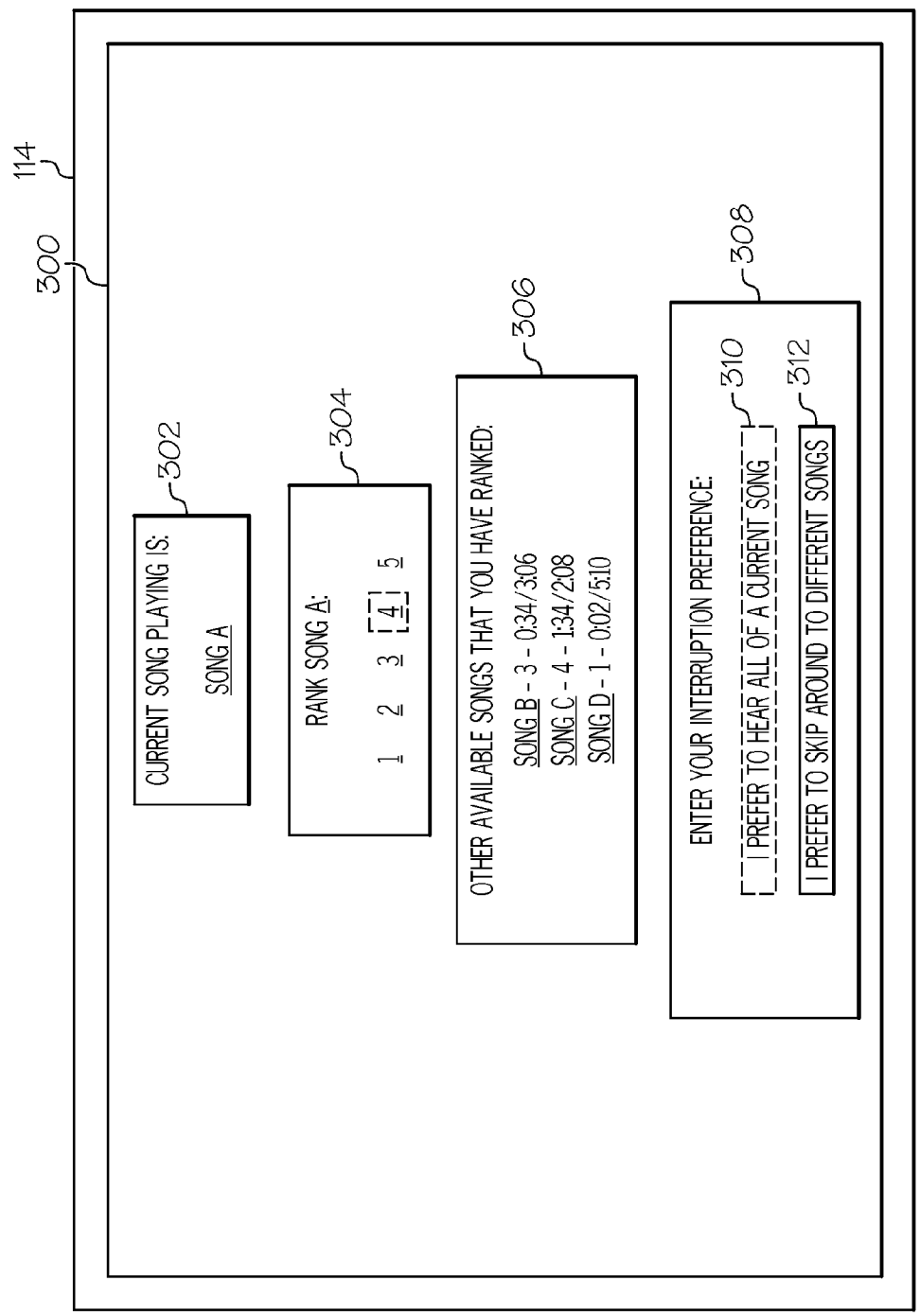
FIG. 3 depicts an exemplary display on the broadcast receiver depicted in FIG. 1.
Figure 4:
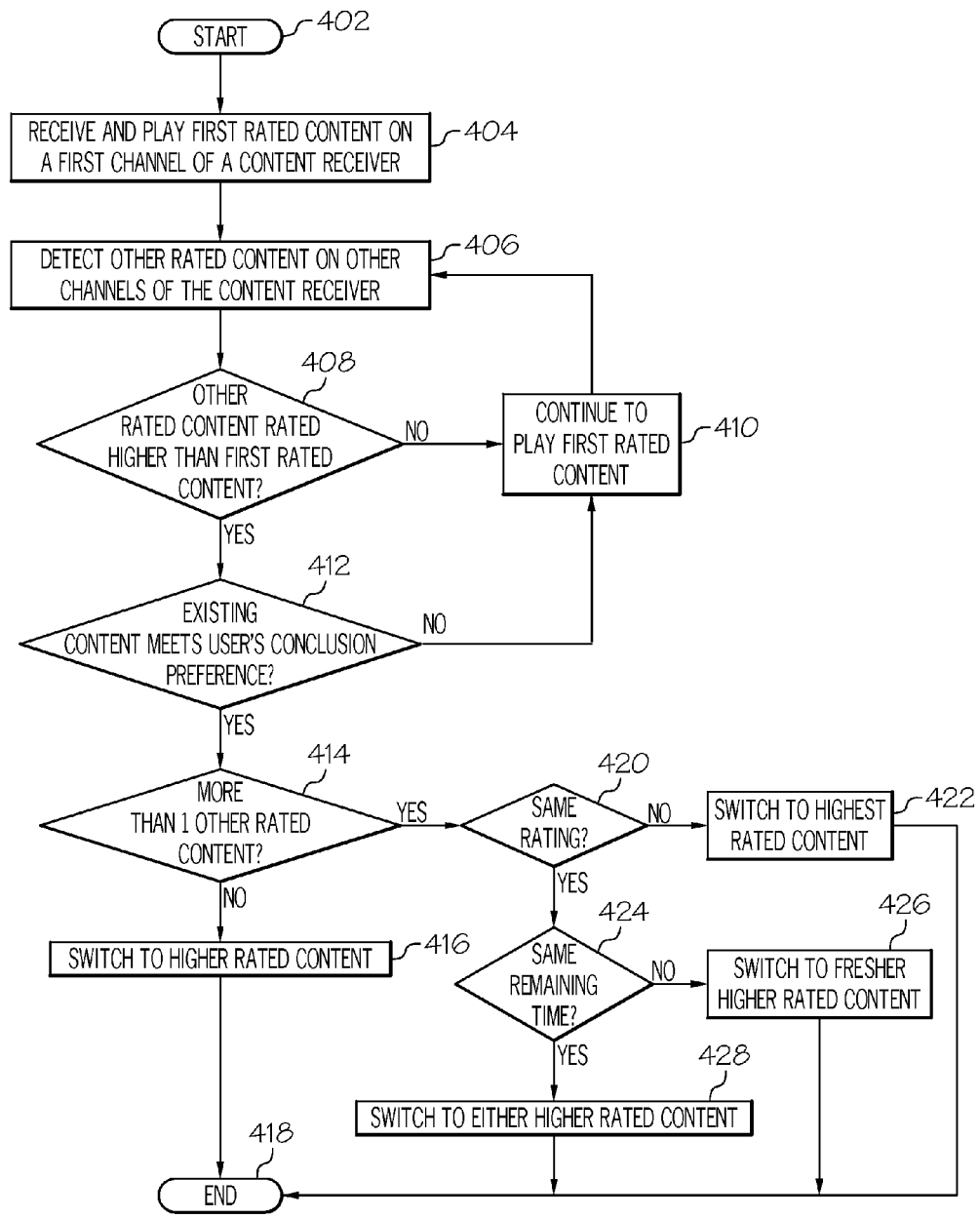
FIG. 4 is a high level flow chart of one or more exemplary steps taken by a processor to automatically select broadcast content at a broadcast receiver.

Application programs 244 also include a content dynamic selection logic (CDSL) 248, which, when executed, performs some or all of the processes described in FIGS. 3-4.

The hardware elements depicted in computer 202 are not intended to be exhaustive, but rather are representative to highlight essential components required by the present disclosure. For instance, computer 202 may include alternate memory storage devices such as magnetic cassettes, digital versatile disks (DVDs), Bernoulli cartridges, and the like. These and other variations are intended to be within the spirit and scope of the present disclosure.

With reference now to FIG. 3, an exemplary user interface 300 on the control display 114 of broadcast receiver 102 depicted in FIG. 1 is presented. Assume for exemplary purposes that control display 114 is part of a radio, such as a car radio. Assume also that a user is listening to the radio. Pane 302 shows that the current song being played on the radio is "Song A". Assume that "Song A" is on a first channel (i.e., is tuned to a first radio frequency). The user of the radio is able to rank the song (i.e., place a value on how much he/she likes the song). Assuming that control display 114 has touch-screen capabilities, then the user merely needs to touch one of the presented rankings in pane 304. As depicted, the user has touched "4", thus causing computer 102 to record that "Song A" has been given a "4" rating by this user, where "1" is the lowest rating/ranking and "5" is the highest rating/ranking that the user can assign.

While a catalog of songs known to the user, along with their respective user-created rankings, can be created using the panes 302 and 304 shown in FIG. 3, in one embodiment this catalog can be imported (with the user-created rankings) from an external device, such as the solid state disk drive 224 (i.e., "flash" drive) or the MP3 player 116 shown in FIG. 2.

Pane 306 in FIG. 3 displays other song titles that are 1) known to the user and 2) are currently available on other radio channels in real time (i.e., while "Song A" is playing on the first channel). Note that pane 306 not only shows the titles of the other songs available on the other channels, but also displays what ranking the current user gave each song, as well as how long the other songs have been on the other channels and how much more of each of the songs is left to hear.

Finally, pane 308 is used during a set-up of preferences by the user regarding whether the user prefers to hear a song to the end (indicated by touching selection 310), or if he prefers that the channel be changed to hear a better song (i.e., of a higher ranking) before the current song is finished (indicated by touching selection 312). In one embodiment, these choices are presented with a sliding scale (not shown), indicating how strong the preference is regarding hearing a first song to the end or being willing to jump to another song before the first song is over. That is, in one embodiment in which the user is willing to switch to another song on another channel before the first song finishes, the user may indicate that he/she is willing to switch to another song if the present song has played for a predetermined percentage of completion (e.g., 75% of the song has played, either from the beginning or in the middle of the song).

With reference now to FIG. 4, a high level flow chart of one or more exemplary steps taken by a processor to automatically select broadcast content from an alternate channel is presented. After initiator block 402, a first broadcast content from a first channel on a broadcast receiver is received and presented (i.e., is made audible via a speaker system and/or is made visible via a display system), as described in block 404. Note that the broadcast receiver (e.g., a radio) has multiple channels on which broadcast content is received. That is, the radio has different channels for receiving content from different broadcasting stations.

As described in block 406, a processor (e.g., from processor unit 204 depicted in FIG. 2) detects a second broadcast content from a second channel on the broadcast receiver. At this point in the process, the first broadcast content (e.g., a first song) is still being presented to the user (e.g., is being sent to the speaker system). However, the broadcast receiver is nonetheless able to identify other broadcast content/songs on channels that are not being sent to the speaker system.

As described in query block 408, a query is made as to whether the second broadcast content (second song) has a higher user-rating than the first broadcast content (first song). That is, a query is made as to whether there is a song on another channel that the user has given a higher rating/ranking to, thus indicating that the user likes the other song (which is not being played through the speakers) better. If the user likes the song he is hearing better than what is available on the other channel, then the radio continues to play the first song (block 410).

However, if the user's rating/ranking of the song on the other channel is higher than that of the song currently being played on the first channel (query block 408), then a query is made as to whether a progress state of the first broadcast content meets a user-set conclusion preference, where the user-set conclusion preference describes a user's level preference for experiencing a conclusion of broadcast content (query block 412). That is, as described above with reference to pane 308 in FIG. 3, the user-set conclusion preference may be that songs be allowed to finish before switching to another song, or the user-set conclusion preference may be that songs can "jump around" before concluding. Thus, if the user has previously indicated that he/she prefers that a song be allowed to finish before switching to another song on another channel (query block 412), then the first song will continue to play (block 410). However, if the first song has finished, or the user doesn't care if it finishes, or the song has played long enough for the user (even if not finished), then a query is made as to whether more than one song previously identified by the user is being sent to another channel on the radio (query block 414). If so, then a query is made as to whether these other songs have a same user-rating (query block 420). If not, then the broadcast content with the highest rating is switched to (block 422). Note that in this embodiment, the processor detects a third broadcast content from a third channel on the broadcast receiver; and then, in response to the third broadcast content having a higher user-rating than the second broadcast content, the processor automatically blocks any switching that would have occurred from the first channel to the second channel (as described above) and automatically switches to the third channel.

Returning to query block 420, assume that the songs on the other channels have the same user-rating. A query is then made to determine which song has the most remaining time (query block 424). As indicated in block 426, the song with the most remaining time (in actual time or percentage of time) will be switched to. If the two equally-ranked songs have the same amount of time remaining (e.g., they both have 3 minutes left), or if the two equally-ranked songs have the same percentage of the songs remaining (e.g., they both have 75% of the song left, which will be a different amount of time for different length songs), then the radio will automatically be switched to either of the other channels. Thus, in this embodiment, the processor detects a third broadcast content from a third channel on the broadcast receiver; and in response to the third broadcast content having a same user-rating as the second broadcast content, the processor determines whether the second content or the third content has a shorter progress state; and the processor automatically switches to either the second channel or the third channel depending on which of the second content and the third content has the shorter progress state. The process then ends at terminator block 418.

Note that in one embodiment, a user may want to hear all of a song available on another channel but is not willing to cut off a song playing on a current channel. In this embodiment, the computer 202 within broadcast receiver 102 depicted above is able to buffer songs in system memory 236 or other memory (not shown). Thus, the user is able to hear the end of the song on the current channel, and then the radio switches to the buffered songs from the other channel. In this embodiment, then, a user-set progress preference has been established (e.g., by using pane 308 in FIG. 3), where the user-set progress preference describes a maximum progress state that is acceptable to a user. A progress state describes how much of a broadcast content has already been broadcast. The second broadcast content from the second channel on the broadcast receiver is buffered to create a buffered second broadcast content, where the buffered second broadcast content is initially hidden from (e.g., is not sent to the radio speakers) a user of the broadcast receiver. In response to determining that the progress state of the first broadcast content does not meet the user-set conclusion preference, the first broadcast content continues to play until the user-set conclusion preference is met. In response to the user-set conclusion preference for the first broadcast content being met (e.g., the first song ends), the buffered second broadcast content is automatically presented to the user (e.g., is sent to the radio's speakers).

As described in panes 302 and 304 in FIG. 3, in one embodiment a song ranking pane is presented on a display of the broadcast receiver. A user input is received from pane 304 to establish a user-rating for the first broadcast content from the first channel while the first broadcast content is being presented on a presentation component of the broadcast receiver.

As described in pane 306 in FIG. 3, in one embodiment a list of other broadcast content currently being broadcast on broadcast channels other than the first channel of the broadcast receiver is presented, where the broadcast content displays a user-rating and a progress state of the other broadcast content.

In one embodiment, the catalog of songs and/or their ratings are extracted from a portable media player, such as MP3 player 116 shown in FIG. 1.

In one embodiment, the computer system can determine how much "better" another song on another channel is than the song currently being played. If there is not enough difference between the two songs to warrant automatically switching to the better song (assuming that the first song is allowed to end prematurely or else has finished), then the user can view the other songs (e.g., via pane 306 shown in FIG. 3), in order to manually switch to the other song. Thus, in this embodiment, the processor establishes a minimum difference between a first user-rating for the first broadcast content and a second user-rating for the second broadcast content. In response to the minimum different not being reached, a user of the broadcast receiver is presented with an option to manually switch to the second channel.

In one embodiment, the computer system factors in whether non-music content (e.g., a commercial, speech by an on-air personality, etc.) is likely to be imminent when ranking a song on another channel. That is, the computer system uses historical data to predict whether the higher ranked song on the other channel is likely to be followed by non-music content. This same prediction is made for another channel which is playing the same higher ranked song. In order to avoid having to immediately switch from the other channel after the higher ranked song finishes (i.e., due to non-music content following the higher ranked song), the channel with the higher likelihood of having the higher ranked song being followed by more music will be chosen.

In one embodiment, the computer system factors in the source of the higher ranked song when switching from the first station to another station. For example, assume that two other stations are playing a same, or alternatively a same ranked, song. In order to determine which station to switch to, the computer system ranks the source of the higher ranked song. For example, if all other factors are the same (i.e., the higher ranked song is the same on both other channels, the higher ranked song has been playing on both other channels for the same amount of time, etc.), then the higher ranked source will be used. If both sources are radio stations, then in one embodiment the station with the strongest signal (as perceived by the radio) is chosen. That is, the source with the greatest fidelity (i.e., "clean" signal that accurately reproduces the content) is chosen. If both sources are radio stations, then in one embodiment a station that has been preselected as "preferred" (due to its format, the user's loyalty, etc.) by the user is selected. If one of the sources is a radio station and the other source is a local content player (e.g., an MP3 player), then the MP3 player is chosen, since 1) all of the song is going to be available without any other processing, and 2) the fidelity of the song is likely to be better than that of the radio station. In this last embodiment, then, being alerted to the fact that the higher ranked/rated song is playing on another station acts as a reminder to the user that he has this higher ranked/rated song on his MP3 player, and thus switches to (or alternatively, prompts the user to switch to) the MP3 player to send its content to the radio system.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described embodiments of the disclosure of the present application in detail and by reference to illustrative embodiments thereof, it will be apparent that modifications and variations are possible without departing from the scope of the disclosure defined in the appended claims.

What is claimed is:

1. A processor-implemented method of automatically selecting broadcast content at a broadcast receiver, the processor-implemented method comprising:
receiving and presenting a first broadcast content from a first channel on a broadcast receiver, wherein the broadcast receiver has multiple channels on which broadcast content is received;
a processor detecting a second broadcast content from a second channel on the broadcast receiver, wherein the first broadcast content and the second broadcast content are audio content;
determining whether the second broadcast content has a higher user-rating than the first broadcast content, wherein user-ratings of the first broadcast content and the second broadcast content are set by a single user of the broadcast receiver;
determining whether a progress state of the first broadcast content meets a user-set conclusion preference, wherein the progress state describes 75 percent of a particular broadcast content that has been broadcast to and received by a particular broadcast receiver, wherein the user-set conclusion preference describes a user's preference for experiencing a conclusion of broadcast content, and wherein the conclusion of the broadcast content includes an end of the broadcast content; and
and in response to determining that the second broadcast content has the higher user-rating than the first broadcast content, and in response to determining that the progress state of the first broadcast content meets the user-set conclusion preference, the processor automatically switching the broadcast receiver from the first channel to the second channel based on the higher user-rating and the progress state of the first broadcast content; establishing a user-set progress preference, wherein the user-set progress preference describes a maximum progress state that is acceptable to the user, and wherein a progress state describes 75 percent of a broadcast content that has already been broadcast; buffering the second broadcast content from the second channel on the broadcast receiver to create a buffered second broadcast content, wherein the buffered second broadcast content is initially hidden from the user of the broadcast receiver; in response to the user-set conclusion preference for the first broadcast content being met, automatically presenting the buffered second broadcast content to the user; the processor detecting a third broadcast content from a third channel on the broadcast receiver; in response to the third broadcast content having a same user-rating as the second broadcast content, the processor determining whether the second broadcast content or the third broadcast content has a shorter progress state, wherein a progress state describes 75 percent of a specific broadcast content that has already been broadcast; and the processor automatically switching to either the second channel or the third channel depending on which of the second broadcast content and the third broadcast content has the shorter progress state.

2. The processor-implemented method of claim 1, further comprising:
presenting a song ranking pane on a display of the broadcast receiver; and
receiving a user input to establish a user-rating for the first broadcast content from the first channel while the first broadcast content is being presented on a presentation component of the broadcast receiver.

3. The processor-implemented method of claim 1, further comprising:
presenting a list of other broadcast content currently being broadcast on broadcast channels other than the first channel of the broadcast receiver, wherein the list of other broadcast content displays a user-rating and a progress state of the other broadcast content.

4. The processor-implemented method of claim 1, wherein the broadcast receiver is a radio.

5. The processor-implemented method of claim 1, wherein the broadcast receiver is a television.

6. The processor-implemented method of claim 1, further comprising:
   extracting a first user-rating for the first broadcast content and a second user-rating for the second broadcast content from a portable media player that is connected to the broadcast receiver.

7. The processor-implemented method of claim 1, further comprising:
   the processor establishing a minimum difference between a first user-rating for the first broadcast content and a second user-rating for the second broadcast content; and
   in response to the minimum difference not being reached, presenting a user of the broadcast receiver an option to manually switch to the second channel.

8. The processor-implemented method of claim 1, wherein the second broadcast content is music, and wherein the processor-implemented method further comprises:
   the processor detecting the second broadcast content being broadcast on the second channel and the third channel;
   the processor predicting a likelihood of non-music content being broadcast after the second broadcast content is detected on the second channel and the third channel; and
   the processor selecting either the second channel or the third channel based on which channel from the second channel or the third channel is less likely to have the non-music content broadcast after the second broadcast content.

9. The processor-implemented method of claim 1, further comprising:
   the processor detecting the second broadcast content being broadcast on the second channel the third channel;
   the processor determining a fidelity of a signal from the second channel and the third channel; and
   the processor selecting either the second channel or the third channel based on which channel has a signal with a greater fidelity.

10. The processor-implemented method of claim 9, wherein the second channel and the third channel both receive broadcast content from radio stations.

11. The processor-implemented method of claim 9, wherein the second channel receives content from a radio station and the third channel receives content from a portable media player.

12. A computer program product for automatically selecting broadcast content at a broadcast receiver, the computer program product comprising a non-transitory computer readable storage medium having program code embodied therewith, the program code readable and executable by a processor to:
   receive and present a first broadcast content from a first channel on a broadcast receiver, wherein the broadcast receiver has multiple channels on which broadcast content is received;
   detect a second broadcast content from a second channel on the broadcast receiver, wherein the first broadcast content and the second broadcast content are audio content
   determine whether the second broadcast content has a higher user-rating than the first broadcast content, wherein user-ratings of the first broadcast content and the second broadcast content are set by a single user of the broadcast receiver
   determine whether a progress state of the first broadcast content meets a user-set conclusion preference, wherein the progress state describes a 75 percent of a particular broadcast content that has been broadcast to and received by a particular broadcast receiver, wherein the user-set conclusion preference describes a user's level preference for experiencing a conclusion of broadcast content, and wherein the conclusion of the broadcast content includes an end of the broadcast content and
   and in response to determining that the second broadcast content has the higher user-rating than the first broadcast content, and in response to determining that the progress state of the first broadcast content meets the user-set conclusion preference, automatically switch the broadcast receiver from the first channel to the channel based on the higher user-rating and the progress state of the first broadcast content; establish a user-set progress preference, wherein the user-set progress preference describes a maximum progress state that is acceptable to the user, and wherein a progress state describes a 75 percent of a broadcast content that has already been broadcast; buffer the second broadcast content from the second channel on the broadcast receiver to create a buffered second broadcast content, wherein the buffered second broadcast content is initially hidden from the user of the broadcast receiver; in response to the user-set conclusion preference for the first broadcast content being met, automatically present the buffered second broadcast content to the user; detect a third broadcast content from a third channel on the broadcast receiver; in response to the third broadcast content having a same user-rating as the second broadcast content, determine whether the second broadcast content or the third broadcast content has a shorter progress state, wherein a progress state describes a 75 percent of a specific broadcast content that has already been broadcast; and automatically switch to either the second channel or the third channel depending on which of the second broadcast content and the third broadcast content has the shorter progress state.

13. A computer system comprising:
   a processor, a computer readable memory, and a computer readable storage medium;
   first program instructions to receive and present a first broadcast content from a first channel on a broadcast receiver, wherein the broadcast receiver has multiple channels on which broadcast content is received;
   second program instructions to detect a second broadcast content from a second channel on the broadcast receiver, wherein the first broadcast content and the second broadcast content are audio content
   third program instructions to determine whether the second broadcast content has a higher user-rating than the first broadcast content, wherein user-ratings of the first broadcast content and the second broadcast content are set by a single user of the broadcast receiver
   fourth program instructions to determine whether a progress state of the first broadcast content meets a user-set conclusion preference, wherein the progress state describes a 75 percent of a particular broadcast content that has been broadcast to and received by a particular broadcast receiver, wherein the user-set conclusion preference describes a user's level preference for experiencing a conclusion of broadcast content, and wherein the conclusion of the broadcast content includes an end of the broadcast content and
   and fifth program instructions to, in response to determining that the second broadcast content has the higher user-rating than the first broadcast content, and in response to determining that the progress state of the first broadcast content meets the user-set conclusion preference, automatically switch the broadcast receiver from the first channel to the second channel based on the higher user-rating and the progress state of the first broadcast content; sixth program instructions to establish a user-set progress preference, wherein the user-set progress preference describes a maximum progress state that is acceptable to the user, and wherein a progress state describes a 75 percent of a broadcast content that has already been broadcast; seventh program instructions to buffer the second broadcast content from the second channel on the broadcast receiver to create a buffered second broadcast content, wherein the buffered second broadcast content is initially hidden from the user of the broadcast receiver; eighth program instructions to, in response to the user-set conclusion preference for the first broadcast content being met, automatically present the buffered second broadcast content to the user; ninth program instructions to detect a third broadcast content from a third channel on the broadcast receiver; tenth program instructions to, in response to the third broadcast content having a same user-rating as the second broadcast content, determine whether the second broadcast content or the third broadcast content has a shorter progress state, wherein a progress state describes a 75 percent of a specific broadcast content that has already been broadcast; and eleventh program instructions to automatically switch to either the second channel or the third channel depending on which of the second broadcast content and the third broadcast content has the shorter progress state; and wherein the first, second, third, fourth, fifth, sixth, seventh, eighth, ninth, tenth, and eleventh program instructions are stored on the computer readable storage medium for execution by the processor via the computer readable memory.

* * * * *